United States Patent [19]

Burgdorf et al.

[11] Patent Number: 5,403,077
[45] Date of Patent: Apr. 4, 1995

[54] HYDRAULIC ASSEMBLY

[75] Inventors: Jochen Burgdorf, Offenbach-Rumpenheim; Peter Volz, Darmstadt; Dieter Dinkel, Eppstein/Ts., all of Germany

[73] Assignee: Alfred Teves GmbH, Germany

[21] Appl. No.: 255,286

[22] Filed: Jun. 8, 1994

Related U.S. Application Data

[63] Continuation of Ser. No. 847,392, Mar. 6, 1992, abandoned.

[30] Foreign Application Priority Data

Mar. 9, 1991 [DE] Germany .................... 41 07 625.7

[51] Int. Cl.⁶ .................... B60T 8/32; B60T 8/42; B60T 8/48
[52] U.S. Cl. .................... 303/115.4; 137/884; 303/113.1; 303/116.2; 303/119.1; 303/116.1; 303/901
[58] Field of Search .................... 303/113.1–119.2, 303/91, 901, 900; 137/899, 351, 884, 596.17; 188/344, 181 A, 181 T; 439/13, 34, 544

[56] References Cited

U.S. PATENT DOCUMENTS

| | | | |
|---|---|---|---|
| 3,538,947 | 11/1970 | Leiber et al. | |
| 3,729,235 | 4/1973 | Bach et al. | 303/114.2 |
| 3,829,166 | 8/1974 | Menar et al. | 303/10 X |
| 3,972,382 | 8/1976 | Takayama et al. | 303/114.2 X |
| 3,979,153 | 9/1976 | Ingram et al. | 303/114.2 X |
| 4,015,881 | 4/1977 | Adachi | 303/114.2 |
| 4,580,848 | 4/1986 | Widmer | 303/116.1 |
| 4,597,611 | 7/1986 | Nishimura et al. | 303/116 PC |
| 4,626,045 | 12/1986 | Takei et al. | 188/344 X |
| 4,636,011 | 1/1987 | Blomberg et al. | 303/116.4 X |
| 4,655,509 | 4/1987 | Ando et al. | 303/10 |
| 4,690,465 | 9/1987 | Takeda et al. | 188/358 X |
| 4,785,848 | 11/1988 | Leiber | 137/884 X |
| 4,796,958 | 1/1989 | Brown, Jr. | |
| 4,824,183 | 4/1989 | Uchida et al. | 303/119.1 |
| 4,828,335 | 5/1989 | Fuller et al. | 303/119.2 X |
| 4,840,544 | 6/1989 | Kuromitsu et al. | 303/116.4 |
| 4,892,363 | 1/1990 | Burgdorf et al. | 303/116.1 |
| 4,953,918 | 9/1990 | Hashida et al. | 303/115 PP |
| 4,955,673 | 9/1990 | Fukuda | 303/91 X |
| 4,998,781 | 3/1991 | Kehl et al. | 303/116 PC |
| 5,011,238 | 4/1991 | Brown, Jr. | 303/113 TR |
| 5,022,717 | 6/1991 | Heibel et al. | 303/119 SV |
| 5,026,127 | 6/1991 | Arikawa | 303/116.1 |
| 5,035,469 | 7/1991 | Geilen et al. | 303/87 |
| 5,039,176 | 8/1991 | Hellmann et al. | 303/119.1 |

(List continued on next page.)

FOREIGN PATENT DOCUMENTS

| | | | |
|---|---|---|---|
| 0449320 | 10/1991 | European Pat. Off. | 303/116.1 |
| 2654930 | 6/1977 | Germany | 137/884 |
| 129359 | 1/1978 | Germany | 137/884 |
| 3300101 | 7/1984 | Germany | 137/884 |
| 3704232 | 8/1987 | Germany. | |
| 3609974 | 11/1989 | Germany. | |

(List continued on next page.)

OTHER PUBLICATIONS

ABS/Traction Control and Advanced Brake Systems, SP-914, Published by Society of Automotive Engineers on Feb., 1992, "Compact ABS Modulator with Small-Solenoid-Valves", Fujita et al, No. 920647, pp. 101–106.
SAE Technical Paper Series NR.830483.

*Primary Examiner*—Douglas C. Butler
*Attorney, Agent, or Firm*—Robert P. Seitter; J. Gordon Lewis

[57] ABSTRACT

The present invention relates to a hydraulic assembly for motor vehicle brake systems with slip control which includes at least a valve arrangement (4), a pressure accumulator system (2, 3) and an auxiliary pressure pump. In order to provide a hydraulic assembly which is as operatively safe as possible and has the greatest possible compactness, a central housing (1) shaped as an assembly carrier is provided which accommodates at least the pump pistons of the auxiliary pressure pump with the drive motor as well as the accumulator pistons of the accumulator system and the valve arrangement.

11 Claims, 4 Drawing Sheets

U.S. PATENT DOCUMENTS

| | | | |
|---|---|---|---|
| 5,058,961 | 10/1991 | Mergenthaler et al. | 303/116.1 |
| 5,066,075 | 11/1991 | Kaneda et al. | 303/113.1 |
| 5,066,076 | 11/1991 | Troster | 303/113.1 |
| 5,078,458 | 1/1992 | Budecker et al. | 303/116.1 |
| 5,094,268 | 3/1992 | Morel et al. | 137/884 |
| 5,152,322 | 10/1992 | Maas et al. | 137/884 |
| 5,213,399 | 5/1993 | Burgdorf et al. | 303/119.1 X |
| 5,213,482 | 5/1993 | Reinartz et al. | 303/116.4 |
| 5,222,524 | 6/1993 | Sekler et al. | 137/884 |
| 5,224,767 | 7/1993 | Kaneda | 303/119.2 |
| 5,236,253 | 8/1993 | Glasmacher | 303/116.4 X |
| 5,244,262 | 9/1993 | Kehl et al. | 303/119.2 |
| 5,269,490 | 12/1993 | Fujikawa et al. | 137/884 X |
| 5,281,013 | 1/1994 | Pichon et al. | 303/116.4 |

FOREIGN PATENT DOCUMENTS

| | | | |
|---|---|---|---|
| 3444205 | 7/1990 | Germany . | |
| 3934624 | 4/1991 | Germany . | |
| 2225168 | 5/1990 | United Kingdom | 303/119 SV |
| 2253665 | 9/1992 | United Kingdom | 303/116.4 |

HYDRAULIC ASSEMBLY

This is a continuation of application Ser. No. 07/847,392, filed on Mar. 6, 1992, now abandoned.

INTRODUCTION

The present invention relates to a hydraulic assembly for motor vehicle dual circuit brake systems with slip control.

BACKGROUND OF THE INVENTION

From the U.S. patent application Ser. No. 689,231, filed Jun. 12, 1991, now U.S. Pat. No. 5,213,399, the hydraulic switching concept of a dual circuit brake system with brake slip control is already known which provides, between a brake pressure generator and the wheel brakes, a low-pressure and high-pressure accumulator system used to either supply the pressure accumulator system with a pressure fluid volume or to draw pressure fluid from it, in dependence upon the switching position of a valve arrangement. The shown high-pressure system comprises an auxiliary pressure pump, each associated with a brake pressure control circuit, which auxiliary pressure pump draws pressure fluid from the preceding low-pressure accumulator in order to supply it to the wheel brakes during a brake slip control action and/or also to the high-pressure accumulator in dependence upon the quantity of pressure fluid actually required. Due to the considerable circuit complexity needed for a brake pressure control action within two brake circuits, the required ability of functional parts to be integrated, which would lead to a brake system of compact design, cannot be achieved.

BRIEF DESCRIPTION OF THE INVENTION

It is, therefore, the object of the present invention to provide an operatively safe hydraulic assembly for dual-circuit brake systems of the aforementioned type which, with the operatively relevant structural components having the greatest compactness possible, can be produced, tested and repaired at favorable costs.

According to the present invention, these objects will be achieved by means of a central housing shaped as an assembly carrier which accommodates at least the pump pistons of the auxiliary pressure pump with the drive motor as well as the accumulator pistons of the accumulator system and the valve arrangement.

A particularly expedient way to carry out the invention can be found wherein the central housing is provided with two housing surfaces located at right angles to each other so that, according to the principle of block design, a block-shaped valve arrangement can be separately flanged onto one housing surface whereas the pump motor and the high-pressure accumulator system are mounted side by side perpendicular to the other plane housing surface. Thus, the precondition for a relatively low overall height of the central housing is given which ensures, among other things, the operativeness of the pump and accumulator pistons at the least installation space required.

A particularly short central housing which has, nevertheless, a low construction will be achieved when both low-pressure accumulators are arranged on the housing side opposite the first housing surface in an axially offset manner as against the two high-pressure accumulators which are perpendicular to the first housing surface. Both, the two high-pressure accumulators and the two low-pressure accumulators enable, due to their twin configuration, a short overall length which is furthered by the displacement of the low-pressure accumulator system as against the high-pressure accumulator system existing in the lateral and height distance. The space requirement within the central housing given by means of the aforementioned arrangement of the accumulator system which is, among other things, also predetermined expediently by means of the position of the pump motor, enables the advantageous transverse and/or horizontal position of the auxiliary pressure pump within the central housing. Thereby, both the housing height and the housing length can be kept astonishingly small. Due to the triangular arrangement of the three housing bores receiving the two high-pressure accumulators and the pump motor within the area of the first housing surface, another important precondition for a central housing design which is as compact as possible is fulfilled which contributes to a minimization of the installation volume by means of the horizontal flanging of the valve arrangement shaped as a valve block onto the second housing surface.

Further features, advantages and possibilities of application will become apparent from the following description of an example of realization shown perspectively.

DETAILED DESCRIPTION OF THE PREFERRED EMBODIMENT OF THE INVENTION

Figure 1A:
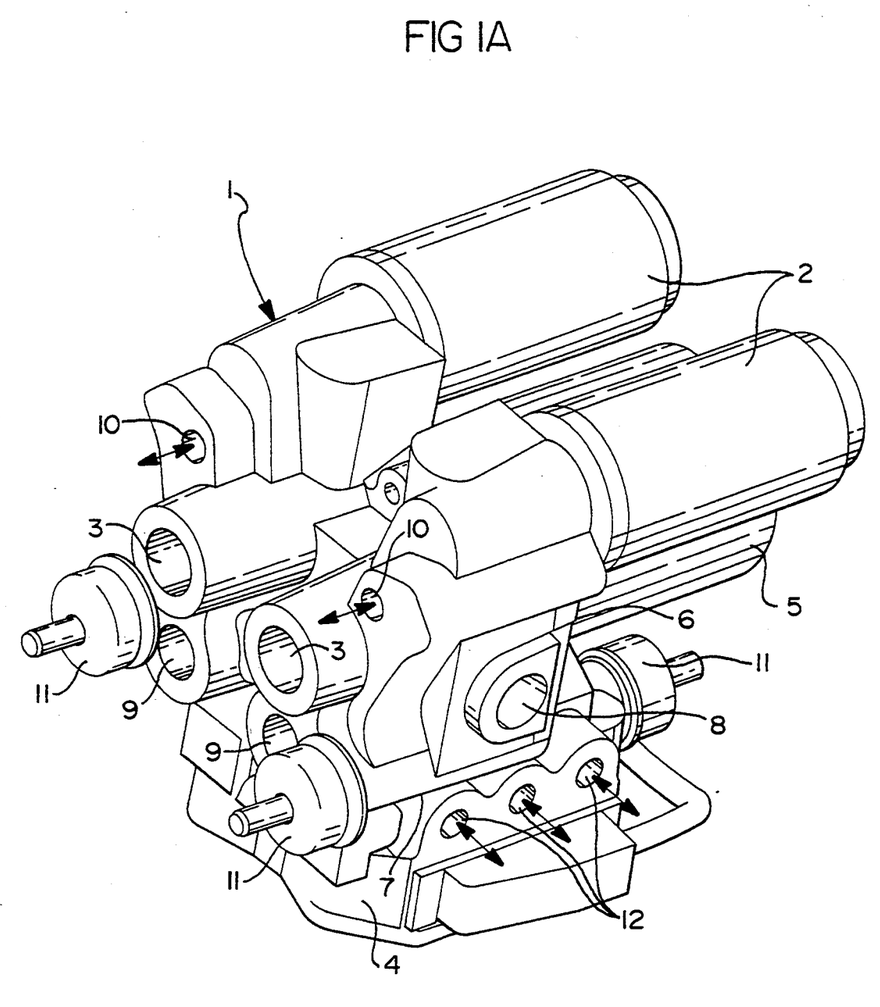
FIGS. 1A and 1B are perspective and partial cutaway illustrations, respectively of a hydraulic assembly embodying the present invention.
Figure 1B:
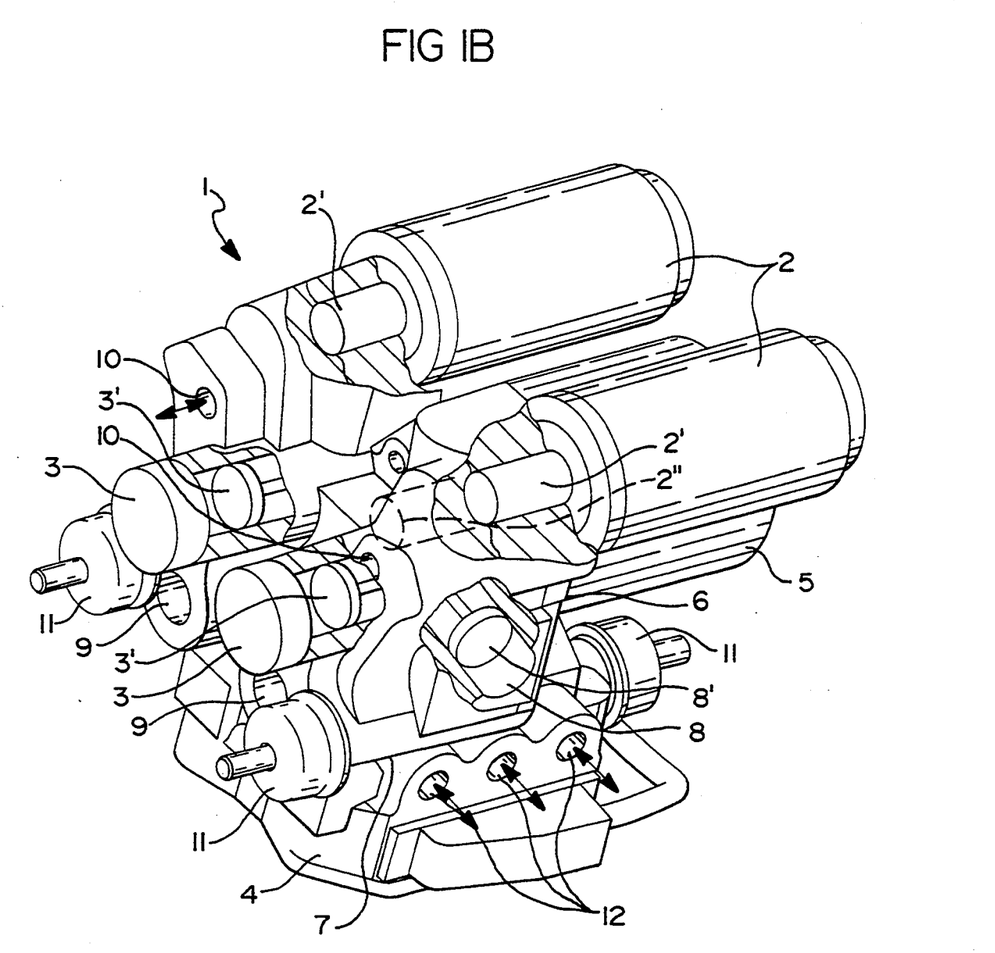
Figure 2:
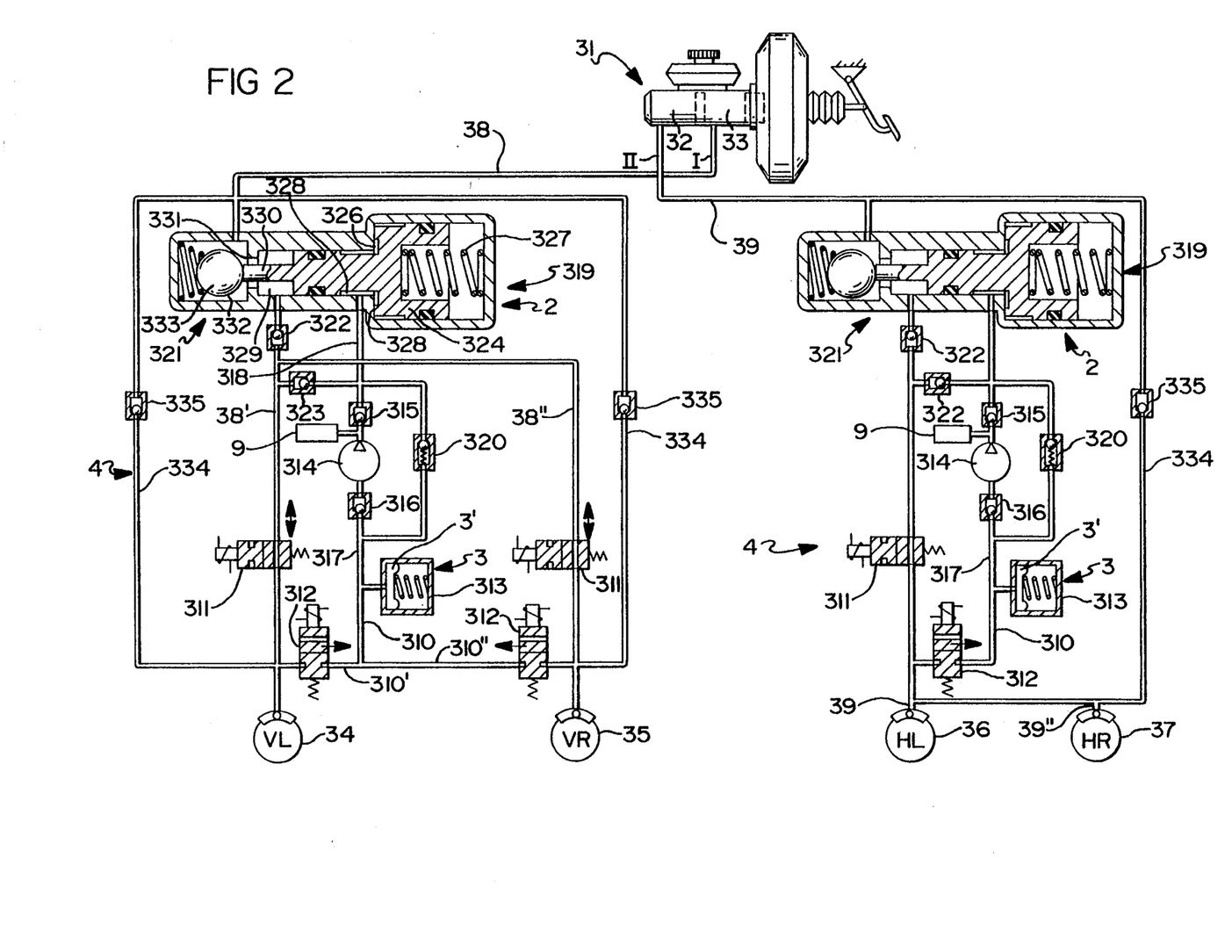
FIG. 2 illustrates a first embodiment of the motor vehicle dual circuit brake system.
Figure 3:
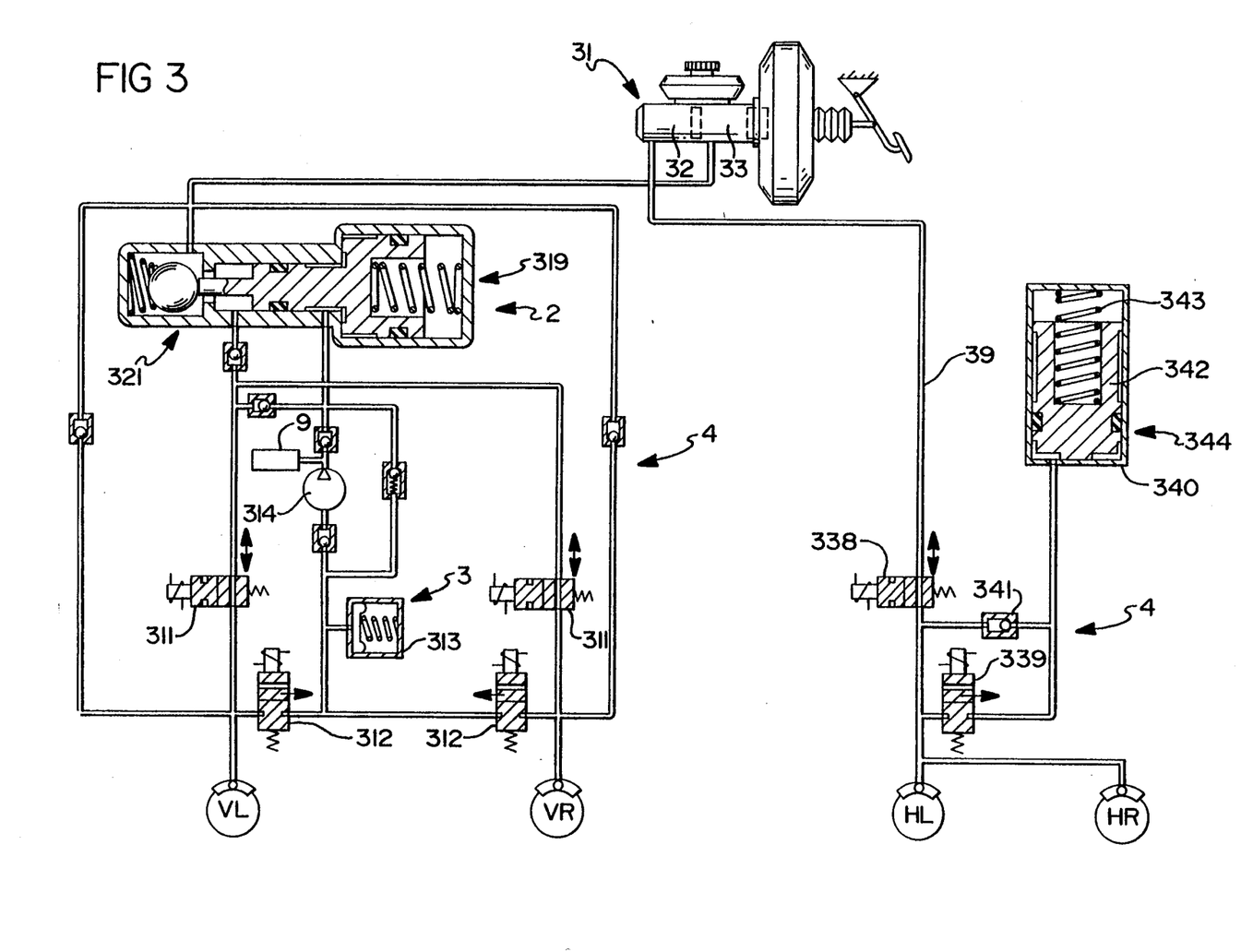
FIG. 3 illustrates a second embodiment of the motor vehicle dual brake system.

The drawing figure shows a three-dimensional illustration of a hydraulic assembly. Reference number 1 denotes the central housing serving as an assembly carrier which is, on the right-hand side, as illustrated in the drawing, furnished with a first plane housing surface 6, vertically projecting from which are the two housings of a high-pressure accumulator 2 which housings are shaped in the form of a cartridge and accommodate the accumulator springs (not illustrated). The accumulator housings are partially disposed within bores 2'. Pump motor 5 is partially disposed within bore 2''. The cylindrical housing of a pump motor 5 which is, in the illustration, downwardly displaced, i.e. in the space between the two high-pressure accumulators 2 arranged in parallel side by side, projects onto the first housing surface 6. The housings of the two high-pressure accumulators 2 and the pump motor housing 5, shaped as deep-drawn parts, are attached onto the first housing surface 6 by means of lancing, caulking, or other suitable known fastening means. A valve arrangement 4 is located in the lower area of the illustration, on a second housing surface 7 arranged normally to the first housing surface 6 and serving as a flange. The valve arrangement 4 which has the components illustrated in FIGS. 2 and 3 arranged such that the functional relationships, as illustrated in FIGS. 2 and 3, are maintained. Further, valve arrangement 4 is provided with three pressure fluid connections 12 which are arranged side by side and lead to the wheel brakes, according to the brake circuit split.

For the attachment onto the second housing surface 7, the valve arrangement 4 is provided with a plurality of screws (not illustrated) which are screwed into the central housing 1. Another mounting variant of the valve block can be achieved by the arrangement of stud bolts in the central housing 1. Upon completion of the mounting of the valve block, its control channels overlap with the pressure fluid channels of the central housing 1, which pressure fluid channels extend in the direction of the auxiliary pressure and accumulator system. The control channels and pressure fluid channels provide fluid communication between the valves and the accumulator systems according to the teachings of FIGS. 2 and 3. In the central housing 1, opposite the first housing surface 6, two connecting bores 10 for the brake pressure generator of the dual-circuit brake system are arranged. Underneath, two cylindrical low-pressure accumulators 3 project from the picture plane. The two pistons 3' of the low-pressure accumulator system 3 (pistons 3' are illustrated in the cutaway portion shown in FIG. 1B are inserted into the associated housing bores of the central housing 1 from the side where the brake pressure generator is connected and are closed in a form-fit manner and/or nonpositively by means of a lid, respectively. Two cylindrical projections arranged slightly below the low-pressure accumulator system 3 provide noise dampening chambers 9 which, for the purpose of reducing the sound emission, are furnished with a hydraulic connection to the auxiliary pressure pump and to the valve arrangement 4. On both sides of the low-pressure accumulator system a suspension 11 each is provided which is damped in conventional rubber bearings. Suspension 11 forms the means whereby the hydraulic assembly is physically joined to the host vehicle. Another bearing point of the three-point suspension is provided on the opposite housing side, underneath the pump motor 5. The pump pistons 81 of the auxiliary pressure pump which are arranged transversely to the shaft of the pump motor 5 are inserted into the central housing 1 via bores 8 provided on both sides of the central housing 1 (only one piston 8' and one bore 8 is illustrated in FIGS. 1). The bores 8 are sealed by means of a screwed cap accommodating the inlet and outlet valves of the pump. Due to the integral design of the central housing 1, mass production using diecasting is possible. The casted blank can then be machined with the necessary threaded connections and various connecting channels. After the machining, the component parts are added to housing 1 and are preferably subjected to a final functional check. The internal details of the present invention as well as the adaptation of the present invention within a brake system can be appreciated by the following: Referring to the drawings, a brake system, constructed in accordance with the present invention, is composed of a tandem master brake cylinder 31 with two working chambers 32 and 33 which are isolated from each other by means of a floating piston. The working chambers 32 and 33 are pressurized by operation of the symbolically illustrated pedal. Allocated to each working chamber 32 and 33 is a brake circuit I, II, brake circuit I comprising the wheel brakes of the front wheels 34, 35 (VL for the front left wheel and VR for the front right wheel) and brake circuit II comprising the wheel brakes 36, 37 of the rear wheels (HL for the rear left wheel and HR for the rear right wheel). Wheel brakes 34, 35 are in communication with the working chamber 33 via a branching brake line 38 (branch lines 38', 38"). Wheel brakes 36, 37 are in communication with the working chamber 32 via a branching brake line 39 (branch lines 39', 39"). Inserted into each branch line 38', 38" is an electromagnetic inlet valve 31 which is open in its initial position. Another inlet valve 31 is interposed into the brake line 39. Associated with each brake circuit is a low-pressure accumulator 313 which is in communication with the wheel brakes via a branching return line 310 (branch lines 310', 310"). An outlet valve 312 is inserted into each branch line 310', 310" to the wheel brakes 34, 35 and is operated electromagnetically and is closed in its initial position. The return line 310 of the rear-wheel brakes 36, 37 likewise contains an outlet valve 312 which is operated electromagnetically and is closed in its initial position. The inlet valves 311 and outlet valves 312 are furnished with switch signals by a non-illustrated electronic control unit which records the rotational behavior of the wheels by means of sensors and which generates the switch signals according to a control algorithm. In order to decrease the pressure in the wheel brakes, pressure fluid is discharged via the outlet valve into the low-pressure accumulator 313. In order to increase the pressure in the wheel brakes, pressure fluid is delivered to the wheel brakes via the inlet valve 311. In the present embodiment, the pressure in the wheel brakes of the front wheels is controlled individually, while a joint control is provided for the rear-wheel brakes. Each wheel brake and/or wheel brake group is in direct connection with the respectively associated working chamber 32, 33 via a relief line 334 containing a non-return valve 335. The non-return valve 335 opens towards the master brake cylinder. The system further includes a pump 314 with a pressure valve 315 and a suction valve 316. The pump 314 is connected at its suction side to the suction line 317 leading to the low-pressure accumulator 313. The pressure side of the pump leads via a pressure line 318 to a high-pressure accumulator 319. Connected in parallel to the pump 314 is a pressure-relief valve 320 which allows pressure fluid to propagate from the pressure side of the pump to its suction side in the presence of excessively high pressure in the high-pressure accumulator 319.

Each of the brake lines 38 and 39 leads to a separating valve 321 which is arranged between the respective working chamber 32, 33 and the inlet valves 311. Furthermore, the pressure side of the pump communicates via a first non-return valve 323 with the brake line between the separating valve 321 and the inlet valve 311. The non-return valve 323 opens towards the brake line. A second non-return valve 322 in each brake line 38 and 39, respectively, is arranged between the separating valve 231 and the junction of the pressure side of the pump into the brake lines. The second non-return valve 322 closes towards the separating valve 321. The accumulator is composed of a stepped piston 324 which is sealingly guided in a correspondingly stepped bore 325. The annular chamber 326 serves as an accumulator chamber. It is connected to the pressure side of the pump 314.

A strong spring 327 is supported on the stepped piston 324 in such a fashion that the step of the stepped piston 324 bears against the corresponding step of the bore 325. The spring 327 is under bias.

The separating valve is composed of an inlet chamber 332 and an outlet chamber 329 which are interconnected by a bore forming the valve seat 331. The outlet chamber 329 is confined by the smaller step of the stepped piston 324. A tappet 330 which is shaped at the smaller step of the stepped piston 324 projects through the bore and cooperates with the valve ball 333 which is arranged in the inlet chamber 332. When the stepped piston 324 is in its basic position shown, tappet 330 abuts on the valve ball 333 and keeps it at a distance from the valve seat 331. Hence, there is free passage between the master brake cylinder 31 and the wheel brakes. When pump 314 delivers pressure fluid into the annular chamber 325, the stepped piston 324 moves to the right as shown in the drawing in opposition to the force of the spring 327. As a result, the tappet 330 is withdrawn so that the valve ball 333 is able to move into abutment on the valve seat 331. The brake line 38 and/or 39 is closed. As mentioned above, spring 327 is subjected to great bias so that high pressure will develop in the annular chamber 326 as soon as the stepped piston 324 moves away from the stop 328, the pressure ranging between 150 and 200 bar. The maximum absorption capacity of the high-pressure accumulator amounts roughly to 3 to 4 cubic centimeters. The system illustrated in FIG. 2 operates according to the following principle.

The brake line is open in the initial position. The strong accumulator spring 327 keeps the stepped piston 324 in abutment on stop 328 so that the tappet 330 keeps the valve ball 333 spaced from the valve seat 331.

The inlet valves 311 are opened, the outlet valves 312 are closed.

When the pedal is operated, pressure fluid is displaced out of the working chambers 32 and 33 to the connected wheel brakes 34, 35, 36, 37. The pressure fluid flows via the open separating valve 321, the non-return valve 322 and the open inlet valve 311 to the wheel brake. Pressure develops in the brake circuits and hence in the wheel brakes which corresponds to the pedal force.

When the brake is released, the pressure fluid flows out of the wheel brakes 34, 35, 36, 37 via the relief line 334 containing the non-return valve 335 back into the master brake cylinder 331.

The rotational behavior of the wheels is constantly monitored by means of sensors, the sensor signals being generated by an electronic analyzing unit (not shown) which, in turn, generates switch signals for the inlet valves 311 and outlet valves 312 as well as for the pump drive.

When the tendency of any one of the wheels to lock is detected by way of the electronic analyzing unit, the system will switch into the anti-lock mode.

In this mode, the inlet valve 311 will be closed and the outlet valve 312 will be opened. Thus, pressure fluid flows out of the brake of the imminently locking wheel into the low-pressure accumulator 313. Since the drive of pump 314 has been activated at the same time, the pressure fluid continues to be supplied into the accumulator chamber 326 of the high-pressure accumulator 319. As a result, the stepped piston 324 moves to the right in opposition to the force of the accumulator spring 327, whereby—because of the bias of spring 327—a considerable amount of pressure will develop instantaneously which ranges between 150 and 200 bar depending on the dimensioning of the brake system. Movement of the stepped piston 324 causes the tappet 330 to release the valve ball 330 so that the latter moves to sit on the valve seat 331. Separating valve 321 closes.

In the meantime, the pressure decrease in the wheel brake enabled the associated wheel to sufficiently re-accelerate. Now the inlet valve 311 will be opened and the outlet valve 312 will be closed for renewed pressure build up. Pressure fluid flows out of the accumulator chamber 326 via the non-return valve 323 and the now open inlet valve 311 to the wheel brake.

By successively opening and closing the inlet valves 311 and outlet valves 312, an optimal slip value can be adjusted on the wheel by adapting the pressure in the wheel brake to the forces which are transmissible between tires and road surface. Pressure fluid is always supplied to the accumulator 319 and discharged therefrom again during a like control action. However, there will always remain a small residual quantity which is sufficient to keep the separating valve 321 closed. Therefore, the master brake cylinder 31 is uncoupled from the wheel brakes and hydraulically isolated during a control action so that the pedal stays in that position which it had adopted upon the commencement of the brake slip control action.

However, if the pedal force is decreased so much that the pertinent pressure in tile master brake cylinder 31 becomes less than the pressure adjusted in a wheel brake, pressure balance will be effected via the non-return valve 335. Thus, the maximum pressure in the wheel brake continues to be determined by way of the pedal force. The pump drive will be interrupted on termination of a slip-controlled braking operation so that no new pressure fluid is introduced into the accumulator 319. The accumulator chamber 326 exhausts via the non-return valve 323, the open inlet valve 311 and the non-return valve 335 into the unpressurized master brake cylinder. The spring 327 moves the stepped piston 324 to the left, the separating valve 321 being opened as a result.

It is the function of the pressure-relief valve 320 to limit the pressure on the pressure side of the pump and thus in the accumulator. When the limit pressure is reached, the valve will open so that now part of the quantity of pressure fluid is constantly circulated by the pump and/or is kept in store in the low-pressure accumulator 313.

According to FIG. 2, the wheel brakes of the front wheels and the wheel brakes of the rear wheels form one brake circuit each, the difference being that the wheel brakes of the front wheels are controlled individually, while a joint control is effected on the wheel brakes of the rear axle. In all other respects, the brake circuits are of identical design and each comprise a low-pressure accumulator 313, a pump 314, a high-pressure accumulator 319 as well as a separating valve.

An alternative brake system is shown in FIG. 3. The front-wheel brake circuit corresponds to the brake circuit of FIG. 2. The rear-wheel brake circuit is composed of a supply valve 338 as well as a drain valve 339. Further, there is a low-pressure accumulator 344. The latter is composed of an accumulator chamber 340, a piston 342 confining the accumulator chamber 340 and a resetting spring 343. The valves 338 and 339 are driven as follows: when any one of the rear wheels tends to lock, the supply valve 338 will be closed and the drain valve 339 will be opened. This causes pressure fluid to flow out of the wheel brakes into the accumulator 340 which, in its size, is rated such as to be able to receive the total volume of pressure fluid of the brake circuit, if need be. Spring 343 is a weak resetting spring so that no essential pressure increase takes place in the intermediate accumulator 344.

The drain valve 339 is operated until the pressure in the wheel brakes is reduced so much that both wheels are free from the risk of wheel lock. The drain valve 339 switches back into its closed position, while the supply valve 338 remains energized and continues to isolate the brake line 39.

The result brought about by this very simple actuation is that the rear wheels will not lock in any case. However, adjustment of an optimal slip value is not possible.

The supply valve 338 will not open until the braking action is completed. Then the accumulator 344 can exhaust via the non-return valve 341 and the open supply valve 338 into the master brake cylinder 31 in order to be operative again upon renewed braking operation. FIG. 3 illustrates a second embodiment of an anti-lock hydraulic brake system constructed in accordance with the present invention.

I claim:

1. A unitary hydraulic assembly for use with a motor vehicle slip control brake system including a brake pressure generator and a plurality of wheel brake circuits, said hydraulic assembly comprising:
   a carrier housing forming a network of fluid passageways therein, at least one of said passageways defining a port for fluid communication with the brake pressure generator;
   a low-pressure accumulator system disposed substantially within said housing in fluid communication with said network;
   a high-pressure accumulator system including at least two accumulator housings and a fluid flow control component, said accumulator housings mounted upon an external surface of said carrier housing, whereby said flow control component is matingly received within said housing and in fluid communication with said network;
   a motor including a motor housing mounted upon the external surface of said carrier housing downwardly displaced between the two accumulator housings;
   an auxiliary pressure pump enclosed substantially within said carrier housing in driven engagement with said motor and in fluid communication with said network, said pump operative to draw pressure fluid from at least one of said accumulator systems and discharge said fluid at an elevated pressure to said wheel brake circuits; and
   an electromagnetically controlled valve block mounted upon the external surface of said carrier housing and forming a plurality of fluid flow channels in fluid communication with said network, said channels defining ports for fluid communication with said wheel brake circuits.

2. The hydraulic assembly of claim 1, wherein said carrier housing comprises a single piece of cast material.

3. The hydraulic assembly of claim 1, further comprising mounting members for mounting said hydraulic assembly on a vehicle such that a sole suspension of said hydraulic assembly is effected.

4. A unitary hydraulic assembly for motor vehicle dual circuit brake systems including slip control and having at least one brake circuit and a brake pressure generator coupled to said circuit, said hydraulic assembly comprising:
   at least one electromagnetically controlled valve arrangement coupled with said brake circuit;
   a hydraulic connection leading from said brake circuit to low-pressure and high-pressure accumulator systems; and
   an auxiliary pressure pump driven by a pump motor to draw pressure fluid from at least one of said pressure fluid accumulator systems and to convert said fluid from a low-pressure energy level to a high-pressure energy level, said unitary assembly further comprising a central housing formed as a carrier enclosing the auxiliary pressure pump and receiving portions of said high-pressure and low-pressure accumulator systems, the valve arrangement and the pump motor being interconnected via internal fluid circuits within said central housing,
   wherein said central housing defines first and second substantially planar housing surfaces, said high-pressure accumulator system and said pump motor being carried upon said first housing surface and said valve arrangement being carried upon said second housing surface, and
   wherein the two housing surfaces are substantially disposed at right angles to each other and wherein the pump motor includes a generally cylindrical housing having a pump motor longitudinal axis disposed normally to the first housing surface.

5. The hydraulic assembly according to claim 4, wherein the high-pressure accumulator system includes at least one generally cylindrical housing having a housing longitudinal axis disposed normally to the first housing surface.

6. The hydraulic assembly according to claim 4, wherein the high-pressure accumulator system comprises two high-pressure accumulators arranged separately side by side, which are carried on the first housing surface, each said accumulator having a housing longitudinal axis extending parallel to a pump motor longitudinal axis.

7. The hydraulic assembly according to claim 4, wherein three housing bores are formed in a triangular arrangement in the first housing surface, said housing bores receiving a portion of said pump motor and two pistons of the high-pressure accumulator system, respectively.

8. The hydraulic assembly according to claim 4, wherein said central housing defines a plurality of bores, and wherein the low-pressure accumulator system comprises two low-pressure accumulators disposed within two of said bores axially offset from a pump motor longitudinal axis, said bores formed on a side of the central housing opposite to the first housing surface, said central housing further defining noise damping chambers disposed in parallel with said low-pressure accumulators.

9. The hydraulic assembly according to claim 4, wherein said valve arrangement comprises a valve block carried upon said second housing surface.

10. A unitary hydraulic assembly for use with a motor vehicle slip control brake system including a brake pressure generator and a plurality of wheel brake circuits, said hydraulic assembly comprising:
   a carrier housing comprising a single piece of cast material forming a network of fluid passageways therein, at least one of said passageways defining a port for fluid communication with the brake pressure generator;
   a low-pressure accumulator system disposed substantially within said housing in fluid communication with said network;
   a high-pressure accumulator system including at least two accumulator housings and a fluid flow control component, said accumulator housings mounted upon an external surface of said carrier housings, whereby said flow control component is matingly received within said housing and in fluid communication with said network;

a motor including a motor housing mounted upon the external surface of said carrier housing downwardly displaced between the two accumulator housings;

an auxiliary pressure pump enclosed substantially within said carrier housing in driven engagement with said motor and in fluid communication with said network, said pump operative to draw pressure fluid from at least one of said accumulator systems and discharge said fluid at an elevated pressure to said wheel brake circuits;

an electromagnetically controlled valve block mounted upon the external surface of said carrier housing and forming a plurality of fluid flow channels in fluid communication with said network, said channels defining ports for fluid communication with said wheel brake circuits; and mounting members for mounting said hydraulic assembly on a vehicle such that a sole suspension of said hydraulic assembly is effected.

11. A unitary hydraulic assembly for motor vehicle dual circuit brake systems including slip control and having at least one brake circuit and a brake pressure generator coupled to said circuit, said hydraulic assembly comprising:

at least one electromagnetically controlled valve arrangement coupled with said brake circuit;

a hydraulic connection leading from said brake circuit to low-pressure and high-pressure accumulator systems;

an auxiliary pressure pump driven by a pump motor to draw pressure fluid from at least one of said pressure fluid accumulator systems and to convert said fluid from a low-pressure energy level to a high-pressure energy level;

a central housing formed as a carrier enclosing the auxiliary pressure pump and receiving portions of said high-pressure and low-pressure accumulator systems, the valve arrangement and the pump motor being interconnected via internal fluid circuits within said central housing;

wherein said central housing defines first and second substantially planar housing surfaces, said high-pressure accumulator system and said pump motor being carried upon said first housing surface and said valve arrangement being carried upon said second housing surface;

wherein the two housing surfaces are substantially disposed at right angles to each other and wherein the pump motor includes a generally cylindrical housing having a pump motor longitudinal axis disposed normally to the first housing surface;

wherein the high-pressure accumulator system comprises two high-pressure accumulators arranged separately side by side, which are carried on the first housing surface, each said accumulator having a housing longitudinal axis extending parallel to a pump motor longitudinal axis;

and wherein three housing bores are formed in triangular arrangement in the first housing surface, said housing bores receiving the portion of said pump motor and two pistons of the high-pressure accumulator system, respectively; and wherein said central housing defines a plurality of bores and wherein the low-pressure accumulator system comprises two low-pressure accumulators disposed within two of said bores axially offset from a pump motor longitudinal axis, said bores formed on a side of the central housing opposite to the first housing surface, said central housing further defining noise damping chambers disposed in parallel with said low-pressure accumulators.

* * * * *